(12) United States Patent
Benson et al.

(10) Patent No.: US 11,297,512 B2
(45) Date of Patent: *Apr. 5, 2022

(54) DARK FIBER DESIGN TOOL FOR HARDWARE, CIRCUITS, AND PATHS

(71) Applicant: AT&T Intellectual Property I, L.P., Atlanta, GA (US)

(72) Inventors: Jeffrey Alan Benson, Shawnee, KS (US); Terri Jones, Bothell, WA (US); Brian Maddux, Clinton, WA (US); David Hill, Trussville, AL (US); Dennis Roofe, Conway, AR (US); Veronica Gensamer, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,251

(22) Filed: Nov. 25, 2020

(65) Prior Publication Data
US 2021/0084502 A1 Mar. 18, 2021

Related U.S. Application Data

(63) Continuation of application No. 16/403,031, filed on May 3, 2019, now Pat. No. 10,887,773.

(51) Int. Cl.
*H04W 16/18* (2009.01)
*H04Q 11/00* (2006.01)
(Continued)

(52) U.S. Cl.
CPC ......... *H04W 16/18* (2013.01); *H04L 41/0893* (2013.01); *H04Q 11/0005* (2013.01);
(Continued)

(58) Field of Classification Search
CPC .............. H04W 16/18; H04L 41/0893; H04Q 11/0005; H04Q 11/0066; H04Q 2011/0016; H04Q 2011/0073; H04Q 2011/009
See application file for complete search history.

(56) References Cited

U.S. PATENT DOCUMENTS

| 2016/0057519 A1* | 2/2016 | Hand | H04Q 11/0066 398/49 |
| 2017/0047999 A1* | 2/2017 | Wei | H04B 10/27 |

OTHER PUBLICATIONS

Office Action for U.S. Appl. No. 16/403,031 dated Apr. 2, 2020, 15 pages.

* cited by examiner

*Primary Examiner* — Mina M Shalaby
(74) *Attorney, Agent, or Firm* — Amin, Turocy & Watson, LLP

(57) ABSTRACT

A dark fiber design tool for hardware, circuits, and paths is provided. A method can include generating, by a system comprising a processor, a data record that identifies respective equipment of a group of dark fiber equipment that have been assigned for a development of new dark fiber network infrastructure usable via a communication network; generating, by the system, a circuit plan representing optical connections between the respective ones of the group of dark fiber equipment as determined based on a first constraint defined by rules; and associating, by the system, respective optical wavelength paths with respective connections of the optical connections of the circuit plan based on a second constraint defined by the rules.

20 Claims, 13 Drawing Sheets

(51) Int. Cl.
*H04L 12/24* (2006.01)
*H04L 41/0893* (2022.01)
(52) U.S. Cl.
CPC ... *H04Q 11/0066* (2013.01); *H04Q 2011/009* (2013.01); *H04Q 2011/0016* (2013.01); *H04Q 2011/0073* (2013.01)

DARK FIBER DESIGN TOOL FOR HARDWARE, CIRCUITS, AND PATHS

RELATED APPLICATION

The subject patent application is a continuation of, and claims priority to, U.S. patent application Ser. No. 16/403,031 (now U.S. Pat. No. 10,887,773), filed May 3, 2019, and entitled "DARK FIBER DESIGN TOOL FOR HARDWARE, CIRCUITS, AND PATHS," the entirety of which application is hereby incorporated by reference herein.

TECHNICAL FIELD

The present disclosure relates to wireless communication systems, and, in particular, to techniques for developing and building wireless communication system infrastructure.

BACKGROUND

Advancements in wireless communication networks have resulted in vast increases to the scope and complexity of new and existing wireless networks. In order to proactively expand wireless communication capabilities for new or existing networks, a network provider can install a dark fiber infrastructure, e.g., network infrastructure such as optical fiber, optical multiplexers, or the like, that is deployed prior to its use in an underlying network. In other words, the optical infrastructure is "dark" since no optical signals flow through the infrastructure until it is incorporated into a communication network. Such infrastructure can be built, for example, based on an agreement to create or expand wireless coverage in a given area.

To the above ends, it is desirable to implement techniques for designing and implementing dark fiber infrastructure with reduced overhead in terms of time, complexity, and/or other costs.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include generating, by a device including a processor, a data record that includes properties of a group of hardware elements associated with a wireless communication network. The method can further include establishing, by the device, a set of rules that define permissible interactions between respective hardware elements of the group of hardware elements based on the data record. The method can additionally include building, by the device, a circuit plan associated with the wireless communication network, where the circuit plan includes optical connections between the respective hardware elements of the group of hardware elements as determined based on the data record and the set of rules. The method can also include associating, by the device, respective optical wavelength paths with respective ones of the optical connections of the circuit plan further based on the set of rules.

In another aspect, a system as described herein can include a processor and a memory that stores executable instructions that, when executed by the processor, facilitate performance of operations. The operations can include producing a data record that identifies respective devices of a group of devices associated with a wireless communication network, establishing a set of rules that define permissible interactions between respective devices of the group of devices based on the data record, constructing a circuit plan for the wireless communication network, the circuit plan including optical connections between the respective devices of the group of devices as determined based on the data record and the set of rules, and assigning respective optical wavelength paths to respective ones of the optical connections of the circuit plan further based on the set of rules.

Figure 1:
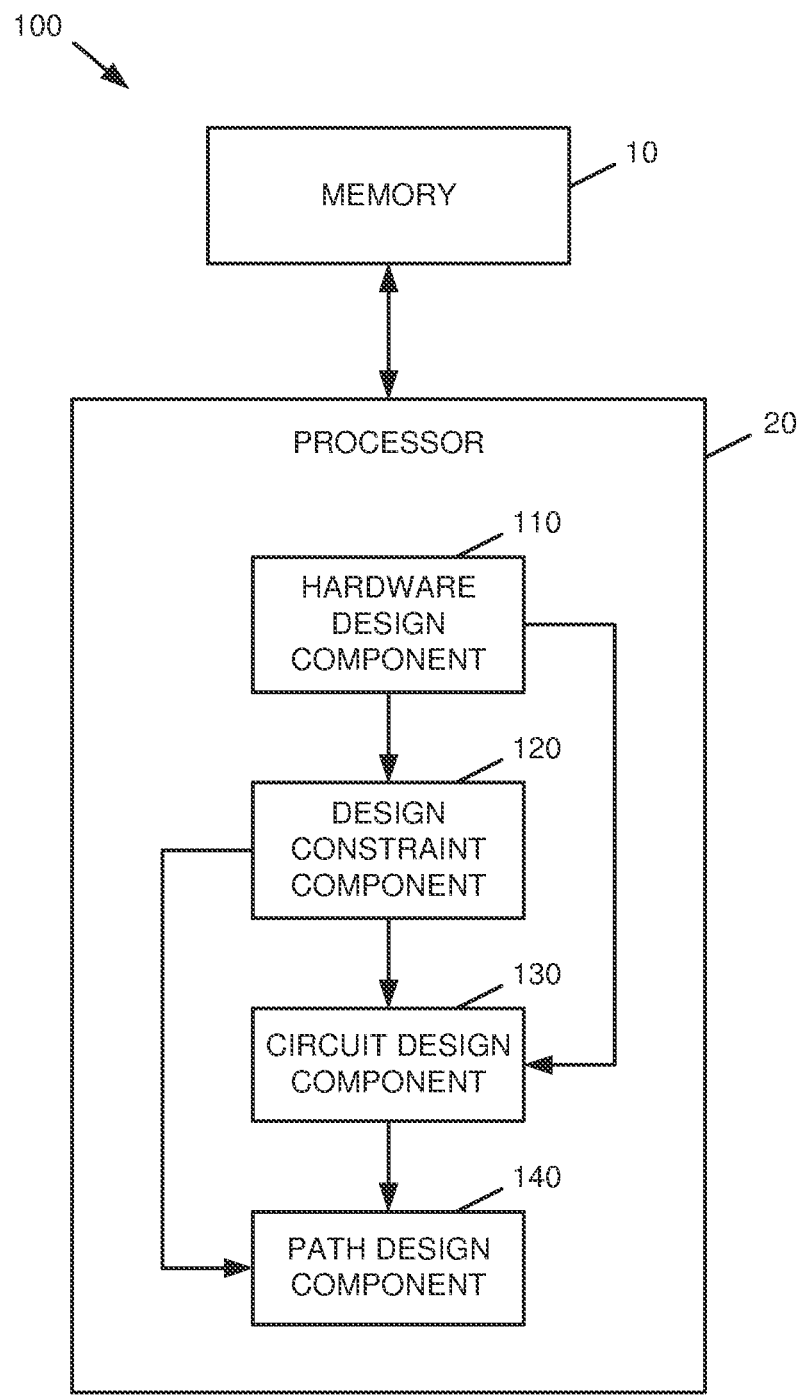
FIG. 1 is a block diagram of a system that facilitates dark fiber network design for hardware, circuits, and paths in accordance with various aspects described herein.

In a further aspect, a machine-readable storage medium as described herein can include executable instructions that, when executed by a processor, facilitate performance of operations. The operations can include generating a listing of respective devices of a group of devices associated with a wireless communication network, defining a set of rules that define permissible interactions between respective devices of the group of devices, planning respective optical connections between the respective devices of the group of devices based on the listing of the respective devices and the set of rules, and assigning respective optical wavelength paths to respective ones of the optical connections of the circuit plan further based on the set of rules Referring first to FIG. 1, a system 100 that facilitates dark fiber network design for hardware, circuits, and paths in accordance with various aspects described herein is illustrated. System 100 as shown by FIG. 1 includes a memory 10 and a processor 20, which can be implemented via one or more computing devices to facilitate various functions. For instance, the memory 10 can include a non-transitory computer readable storage medium that contains computer executable instructions, and the processor 20 can execute instructions stored by the memory 10. For simplicity of explanation, various actions that can be performed via the memory 10 and the processor 20 are shown and described below with respect to various logical components. In an aspect, the components described herein can be implemented in hardware, software, and/or a combination of hardware and software. For instance, a logical component as described herein can be implemented via instructions stored on the memory 10 and executed by the processor 20. Other implementations of various logical components could also be used, as will be described in further detail where applicable.

In an aspect, the memory 10 and the processor 20 can be associated with a common computing device. Alternatively, some or all functionality of the memory 10 and/or the processor 20 can be distributed among multiple computing devices, e.g., devices of a computing cluster and/or other separate devices that are connected via any suitable wired or wireless networking means. For instance, a first computing device can include a memory 10 and a processor 20 configured for implementing a first subset of logical components, a second computing device can include a separate memory 10 and processor 20 for implementing a second subset of logical components that can intersect or be mutually exclusive to the first subset, and so on.

In an aspect, the logical components that can be implemented via the processor 20 as shown by FIG. 1 include a hardware design component 110 that can produce a data record that includes properties of a group of hardware elements associated with a wireless communication network, e.g., a new dark fiber network or an expansion to an existing dark fiber network. The group of hardware components can include, e.g., network equipment (optical multiplexers or muxes, transponders, chassis into which respective pieces of network equipment can be installed, etc.) or other physical devices that can be optically and/or electrically connected via a circuit to form some or all of a wireless communication network. Examples of techniques that can be utilized by the hardware design component 110 to generate a data record in this manner are further described below with respect to FIGS. 4-5.

The logical components shown by FIG. 1 can further include a design constraint component 120, which can establish a set of rules that define permissible interactions between respective hardware elements as set forth in the data record produced by the hardware design component 110. These permissible interactions can be based on port or slot capacities, supported optical wavelengths, supported signal types and/or communication protocols, and/or any other suitable factors. Operation of the design constraint component is described in further detail below with respect to FIG. 6.

The logical components as shown in FIG. 1 can further include a circuit design component 130, which can build a circuit plan associated with the wireless communication network by assigning optical connections between the respective hardware elements represented in the data record produced by the hardware design component 110 based on restrictions to such connections as established by the design constraint component 120. Operation of the circuit design component 130 is described in further detail below with respect to FIG. 7.

Additionally, the logical components shown by FIG. 1 can include a path design component 140, which can associate respective optical wavelength paths with respective optical connections of the circuit plan as generated by the circuit design component 130. In an aspect, the optical wavelength paths generated by the path design component 140 can be restricted based on design constraints provided by the design constraint component 120 in a similar manner to the operation of the circuit design component. Operation of the path design component 140 is described in further detail below with respect to FIG. 9.

Various techniques as described herein can facilitate the design and implementation of dark fiber infrastructure, e.g., cables, multiplexers, and/or other network infrastructure that is built prior to the implementation of the infrastructure into a communication network. As centralized radio access network (CRAN) architectures and wireless standards such as 5G have been developed, the concepts of hubbing as well as the separation of wireless equipment between locations has been introduced. To accommodate the capacity associated with these networks and to provide for future scaling while reducing costs associated with fiber, a wireless network can employ dark fiber, e.g., fiber optic cables that are installed at a given point in time and subsequently used as desired for implementing and/or expanding a wireless network. Further, this dark fiber can be capable of utilizing multiple optical wavelengths (e.g., light colors) via the use of optical multiplexers (or "dark fiber multiplexers"). For instance, by enabling a single fiber to carry light according to multiple colors that are supported by a connected multiplexer, the number of colors that are transferred over the single fiber can be functionally equivalent to the same number of physical fibers, e.g., by enabling the transfer of multiple simultaneous data streams over a single fiber.

Figure 2:
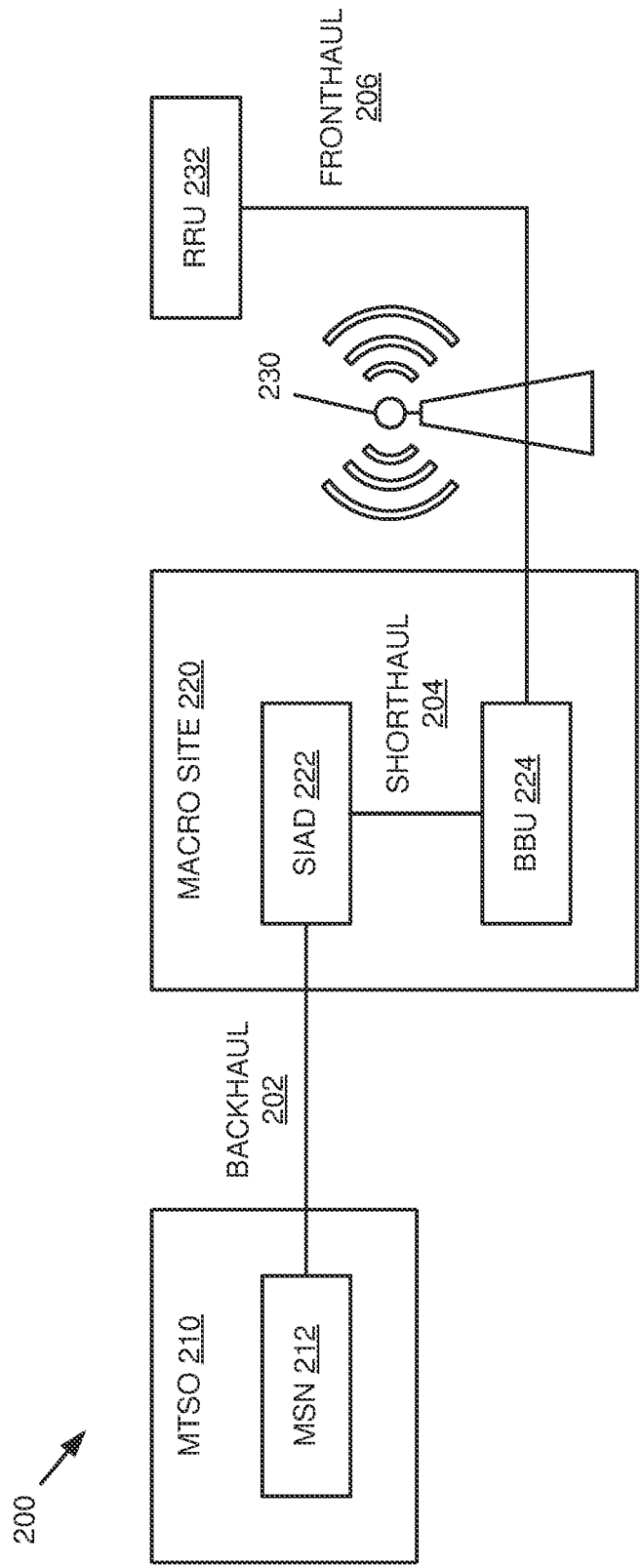
FIGS. 2-3 are diagrams depicting simplified schematics of respective example network architectures in which various aspects described herein can function.

In view of the new design strategies for wireless networks being developed, techniques for designing and planning dark fiber and associated multiplexers that support those strategies are desirable. As an example, in addition to a backhaul link, modern wireless networks can also include additional links such as shorthaul and fronthaul. In the non-limiting example shown by diagram 200 in FIG. 2, the backhaul (BH) 202 is the segment of the wireless network that spans from a Multi Service Node (MSN) 212 at a Mobile Telephone Switching Office (MTSO) 210 to a cell (macro) site location 220 associated with a Smart Integrated Access Device (SIAD) 222. In some cases the MTSO 210 and macro site 220 are at different physical locations (e.g., they are non-collocated), meaning that the backhaul 202 can be designed to accommodate such a distance.

As further shown by diagram 200, the shorthaul (SH) 204 is the segment in the wireless network between the SIAD 222 and the Baseband Unit (BBU) 224. In the example shown in diagram 200, the SIAD 222 and BBU 224 are collocated, meaning that the shorthaul 204 can be implemented by means such as simple fiber jumpers.

The fronthaul (FH) 206 shown in diagram 200 is the segment in the wireless network between the BBU 224 and the Remote Radio Unit (RRU) 232. As further shown by diagram 200, the RRU 232 can be associated with one or more radio transmitters 230, such as cell towers or other suitable transmitting devices. In the example shown by diagram 200, the BBU 224 and RRU 232 can be collocated at the macro site 220 or separated by a sufficiently short distance such that the shorthaul 204 can be implemented via a direct fiber between the equipment.

Figure 3:
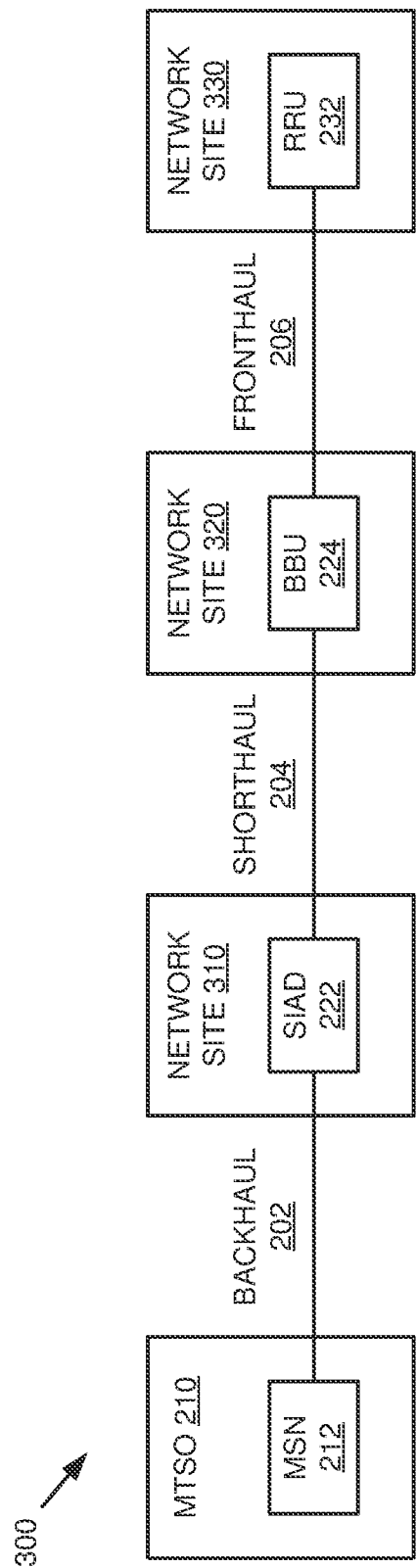

In contrast to the network shown by diagram 200, diagram 300 in FIG. 3 shows an example network in which CRAN, 5G, and/or other networking techniques are employed to facilitate the spread of network elements over larger distances. Thus, as shown by diagram 300, the SIAD 222, BBU 224, and RRU 232 can each be implemented at respective physically separate network sites 310, 320, 330, such that the backhaul 202 provides a link between the MSN 212 housed at the MTSO 210 and the SIAD 222 housed at network site 310, the shorthaul 204 provides a link between the SIAD 222 and the BBU 224 housed at network site 320, and the fronthaul 206 provides a link between the BBU 224 and the RRU 232 housed at network site 330. In addition to the links shown in diagram 300, further segments such as midhaul and sidehaul can be introduced which can separate various network modules by even greater distances. In an aspect, the separation of modules as shown by diagram 300 can be done to shorten latency and provide data to the network core more quickly, thereby enabling faster data processing to support latency-sensitive technologies such as augmented reality, self-driving cars, etc.

In an aspect, various techniques herein can facilitate the design and implementation of dark fiber and associated muxes in an all-encompassing tool that incorporates backhaul, shorthaul, and fronthaul. Techniques described herein can facilitate designing and planning of a hardware layout, bill of materials, fiber circuit definitions, wave paths, and end-to-end paths using a fully encompassing tool. Further, the tool can integrate into further network management systems to allow for the design to be built, documented, and managed.

Techniques described herein can support respective designs in quantity, because each of the network locations shown in diagram 300 (e.g., MTSO 210 and network sites 310-330) can have many wireless functional device instances. Further, a tool according to various aspects herein can be expandable for future segements that are introduced in the wireless network. For instance, the tool could be expanded to support midhaul where the BBU is seperated between the contol plane and data plane, as well as to support and side haul where the BBU is elastically tied to other BBUs to support inter-BBU handoffs with X2 traffic and signaling.

Returning to FIG. 1, the hardware design component 110, circuit design component 130, and path design component 140 can facilitate, either independently or as commonly implemented in a software tool or other means, a hierarchical design of a dark fiber infrastructure. More particularly, the hardware design component 110 can facilitate assignment of dark fiber hardware, the circuit design component 130 can facilitate fiber connections between respective pieces of hardware as assigned by the hardware design component 110, and the path design component 140 can assign light colors (e.g., wavelength paths) to be used over the fiber connections established by the circuit design component 130. Other techniques can also be used. In an aspect, a network plan as developed by system 100 can be structured in segments, e.g., based on points representing hardware elements and segments connecting those hardware elements. As used herein, each segment associated with a network plan can be associated with an A point (e.g., a beginning point) and a Z point (e.g., an ending point). Other naming conventions can also be used.

In an aspect, an infrastructure as designed by system 100 can be based on existing dark fiber installations. For instance, a dark fiber network as planned by system 100 can include muxes and/or other hardware elements that are implemented to work with previously installed fibers at a network site. Alternatively, a tool as implemented via system 100 can serve as a basis for installation of new dark fiber as well as a network infrastructure to be developed with the newly installed fibers. For instance, system 100 can be used to develop new network infrastructure based on an agreement between a network provider and a customer to build out network coverage for a market and/or a geographic area (e.g., a shopping mall, a sports stadium, a convention center, etc.).

In general, the hardware design component 110 can be used to build a hardware template for dark fiber equipment. The circuit design component 130 can be used to define mux to demux (de-multiplexer) cables to connect the dark fiber equipment together in either a point-to-point or ring configuration. The path design component 140 can be used to create an A-to-Z path of ports and cables that are incrementally attached to reach from the A element to the Z element. The A and Z elements used by the path design component 140 can be, but are not limited to, a RRH, BBU, evolved Node B (eNB or eNodeB), SIAD, MSN, collector interconnect port, and/or other defined port.

Figure 4:
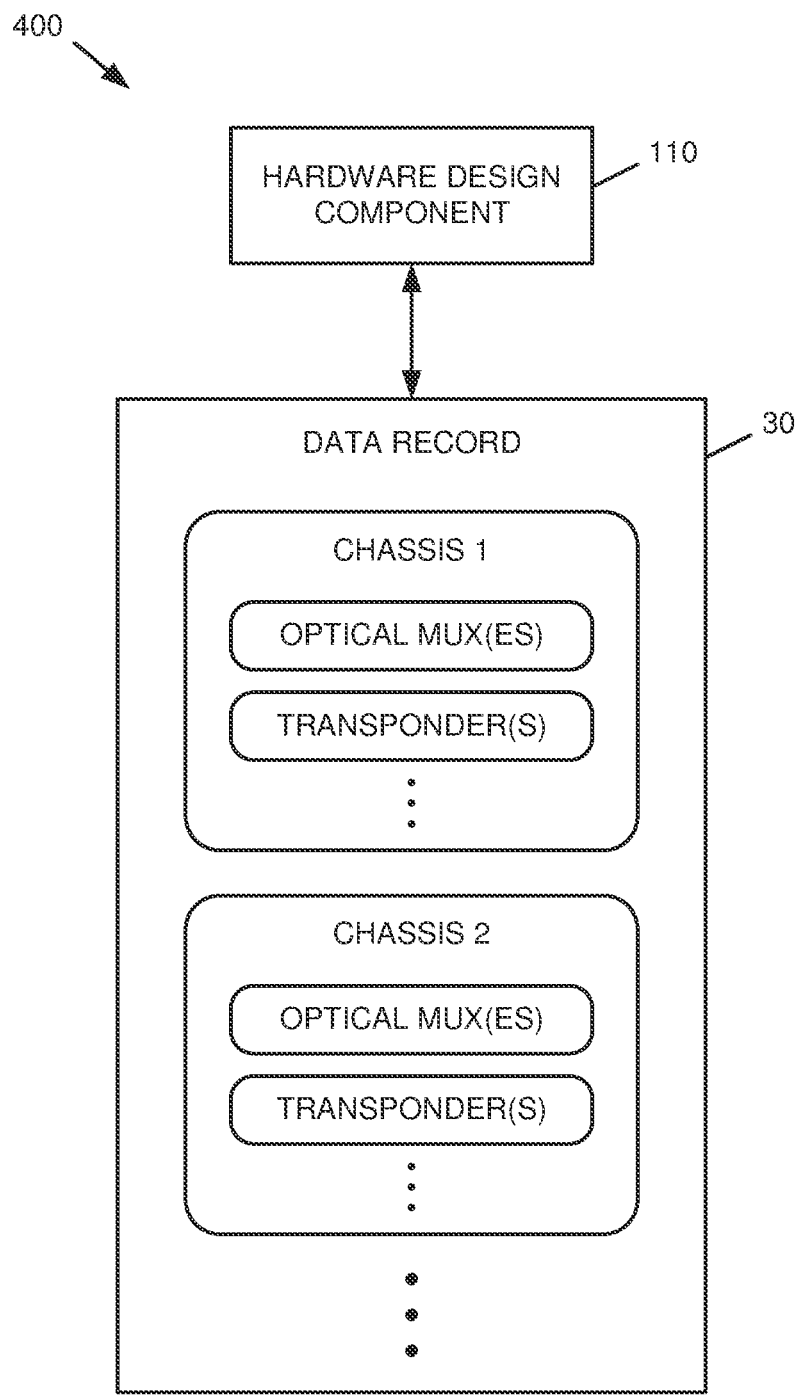
FIG. 4 is a block diagram of a system that facilitates creation of a hardware design for a dark fiber network in accordance with various aspects described herein.

With reference now to FIG. 4, a block diagram of a system 400 that facilitates creation of a hardware design for a dark fiber network in accordance with various aspects described herein is illustrated. Repetitive description of like elements employed in other embodiments described herein is omitted for sake of brevity. As shown by FIG. 4, the hardware design component 110 as described above with respect to FIG. 1 can be utilized to generate a data record 30 that includes identities and properties of dark fiber equipment to be used in a dark fiber network. In an aspect, the data record 30 produced by the hardware design component 110 can correspond to network hardware at a given location, e.g., a network site or a collection of network sites, that can subsequently be connected via the circuit design component 130 and the path design component 140.

In an aspect, the hardware design component 110 can facilitate the creation of data relating to a dark fiber chassis that can in turn include desired networking equipment. To this end, the hardware design component 110 can utilize a dark fiber hardware template that initially provides the ability to add one or more specific chassis within a location. While FIG. 4 depicts an example data record 30 having two chassis, it should be appreciated that the data record 30 can contain information regarding any suitable number of chassis as appropriate for a given network plan. The chassis listed in the data record 30 can be standalone chassis, or alternatively they can be extension chassis that lack the functionality of a full standalone chassis but instead provide additional capacity to an existing chassis.

As further shown by FIG. 4, the data record 30 can contain, for each associated chassis, devices that are housed within and/or otherwise associated with that chassis. For instance, FIG. 4 illustrates that a chassis can be associated with one or more optical multiplexers and one or more transponders. Other equipment can be used in connection with a chassis in addition to, or in place of, the equipment shown in FIG. 4.

Figure 5:
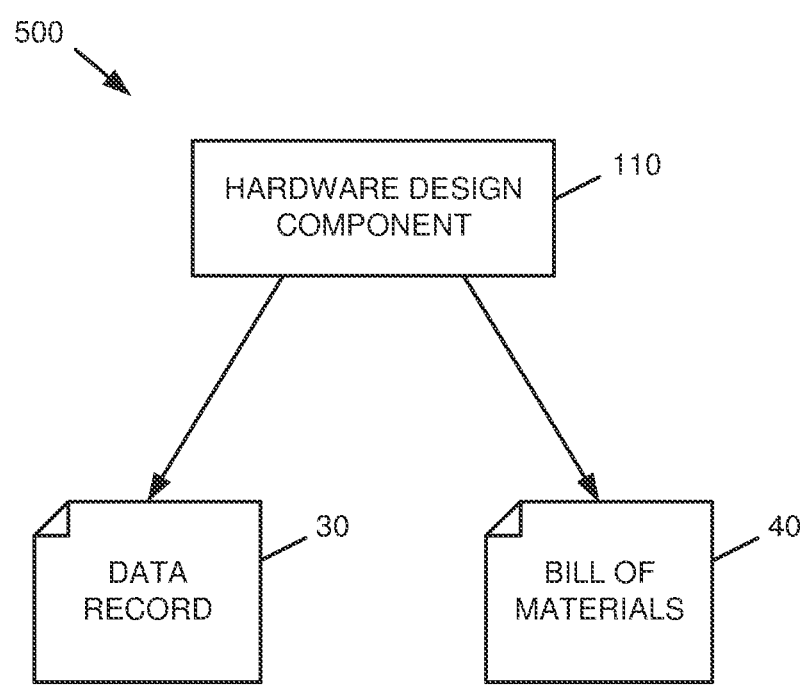
FIG. 5 is a block diagram depicting example outputs of a hardware design component as implemented in accordance with various aspects described herein.

Upon completion of the data record 30 containing the hardware design for the network, the hardware design component 110 can utilize the data record 30 to establish a bill of materials (BOM) 40 corresponding to the data record 30, as shown by system 500 in FIG. 5. In an aspect, the BOM 40 can include a listing of respective hardware elements (e.g., chassis, muxes, transponders, etc.) of the group of hardware elements as established in the data record 30. Once created, the BOM 40 can be provided to vendors and/or other entities to request quotes for equipment listed in the BOM 40 and/or to place orders for said equipment in order to facilitate building the planned network.

Figure 6:
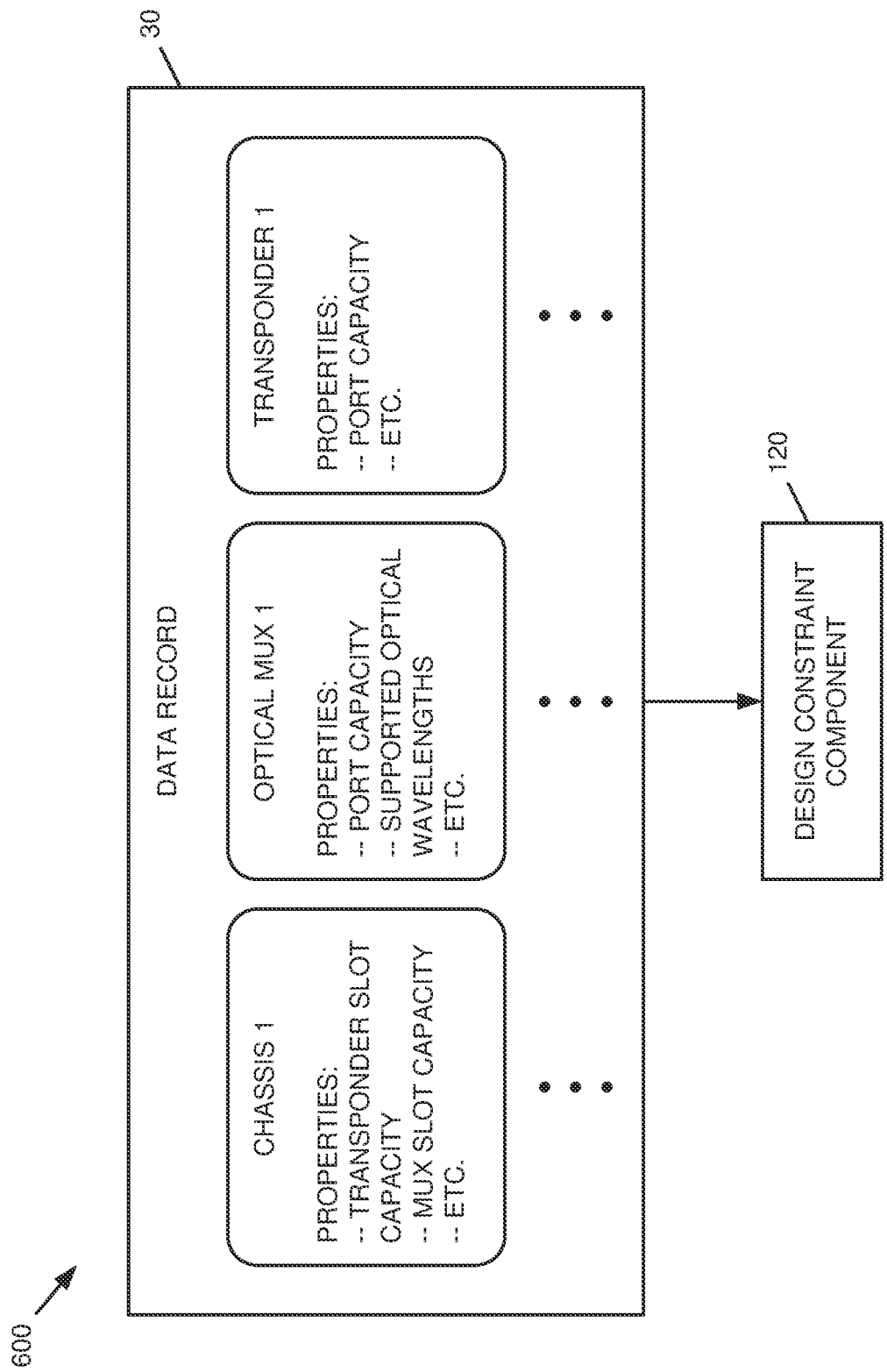
FIG. 6 is a block diagram of a system that facilitates establishing network design constraints based on network device properties in accordance with various aspects described herein.

In an aspect, the data record 30 can be configured to supplement a listing of equipment as assigned by the hardware design component 110 with respective properties of the assigned equipment, as shown by system 600 in FIG. 6. In an aspect, the properties of a hardware item listed in the data record 30 can vary based on the type of hardware item. By way of specific, non-limiting example, equipment properties that can be included in the data record 30 can include, but are not limited to, the following:

Dark Fiber Chassis
  1) Transponder slot capacity
  2) Mux slot capacity
  3) Transmit/receive port capacity
Optical Multiplexer
  1) Transmit/receive port capacity
  2) Supported optical wavelengths, e.g., given as a number of supported wavelengths or a listing of the supported wavelengths)
  3) Number of chassis mux slots occupied when installed
Transponder
  1) Client port (CPE)/wave division multiplexing (WDM) port capacity
  2) Support of respective CPE/WDM ports for small form factor pluggable (SFP) modules
  3) Number of chassis transponder slots occupied when installed Other properties than those listed above are also possible.

In addition, respective hardware components provided in the data record 30 can be packaged with unique labeling in order to allow downstream systems to more efficiently utilize the data contained in the data record 30. Labeling schemes that can be utilized in this manner are described in further detail below. Further, while not shown in FIG. 6 for simplicity of illustration, the hardware components and their properties can follow a design hierarchy, e.g., as shown in FIG. 4, that can enable the respective components to build upon one another.

As further shown by FIG. 6, the properties of the respective hardware components as provided in the data record 30 can be utilized by the design constraint component 120 to establish rules regarding permissible circuit and path designs based on the hardware components and their properties.

Figure 7:
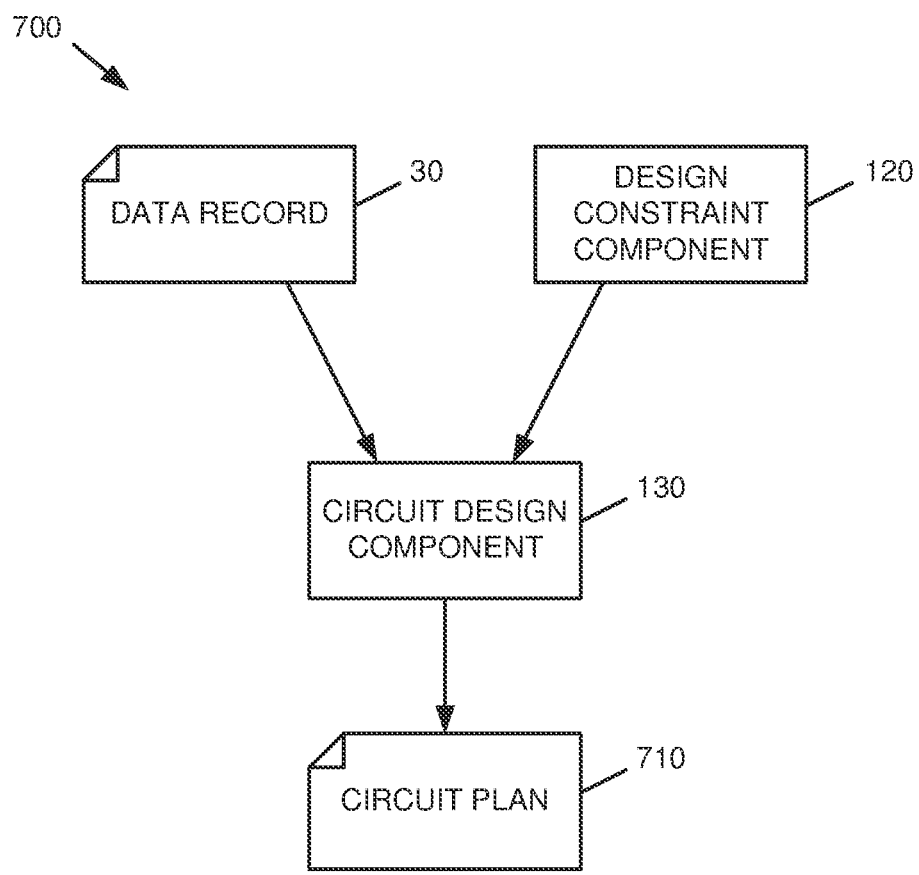
FIG. 7 is a block diagram of a system that facilitates creation of a circuit design for a dark fiber network in accordance with various aspects described herein.

With reference next to FIG. 7, a block diagram of a system 700 that facilitates creation of a circuit design for a dark fiber network in accordance with various aspects described herein is illustrated. Repetitive description of like elements employed in other embodiments described herein is omitted for sake of brevity. As shown in system 700, the circuit design component 130 can provide a mechanism for creation of a circuit plan 710 based on physical hardware as specified in the data record 30 created by the hardware design component 110 (not shown in FIG. 7) and the design constraints imposed by the design constraint component 120 as described above with respect to FIG. 6. In an aspect, the circuit design component 130 can establish dark fiber endpoints (e.g., A to Z points) and assign those points to hardware components in the data record 30 as derived by the hardware design component 110 as described above.

In an aspect, the circuit plan 710 can be utilized to establish various circuit types, such as a point-to-point circuit and/or a ring circuit, as well as respective rules for meeting engineering design specifications associated with the circuit. Additionally, the circuit plan 710 as generated by the circuit design component 130 can include labels for respective components of the circuit to provide to respective other systems in a logical format.

As defined herein, a point-to-point circuit is a circuit that connects respective sites in a unidirectional manner—site A to site B, site B to site C, and so on, with no connection between the A and Z points. In contrast, a ring circuit establishes two-way connections between each site in the circuit, including the A site and the Z site, in a ring configuration such that optical signals can travel clockwise or counterclockwise along the ring. This provides redundancy such that in the event of a node failure, all other nodes in the ring can remain accessible. In addition, a circuit as planned by the circuit design component 130 can combine elements of a point-to-point circuit and a ring circuit. For instance, a circuit can include respective nodes in a ring configuration with point-to-point subcircuits extending from one or more of the nodes, or vice versa.

Figure 8:
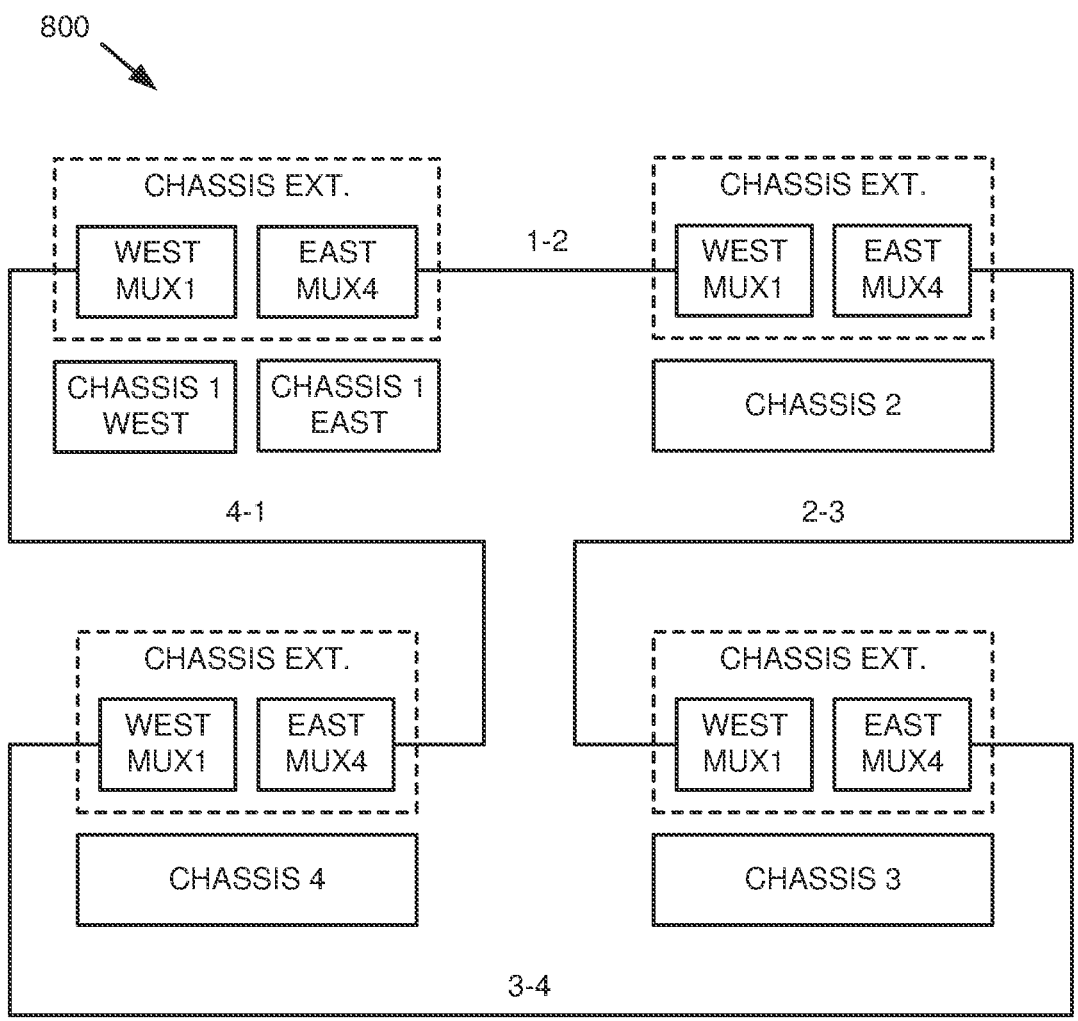
FIG. 8 is a diagram depicting a simplified example of a circuit structure that can be utilized in accordance with various aspects described herein.

An example of a ring circuit that can be configured by the circuit design component 130 is shown by diagram 800 in FIG. 8. The circuit shown in diagram 800 contains four nodes labeled 1, 2, 3, and 4 connected in a ring configuration, where each of the nodes are associated with a chassis and an extension chassis in which an optical multiplexer is housed. It should be appreciated that diagram 800 is intended merely as an example circuit that can be used, and that other configurations could be used. For instance, the circuit could be made point-to-point by removing the connection between nodes 4 and 1 or the connection between nodes 1 and 2. As another example, the circuit could contain more nodes (e.g., 6 nodes and/or any other suitable number of nodes) or less nodes than that shown by diagram 800. As still another example, respective nodes in the circuit can be configured with additional and/or different equipment, such as transponders, additional multiplexers, or the like. As still another example, the respective chassis shown in diagram 800 could themselves be associated with multiplexers or other hardware components in addition to their respective extension chassis. Other permutations, of course, could also be designed.

As shown in diagram 800, connections between respective nodes are labeled to show the starting point of the connection and the ending point of the connection, e.g., 1-2 for the connection from node 1 to node 2 and so on. As the circuit shown by diagram 800 is a ring circuit, the connections could also run in the reverse direction, e.g., from node 2 to node 1. In this case, the label for the connection could be reversed, e.g., 2-1, to indicate the direction with which the connection is associated.

While the circuit shown in diagram 800 shows single connections running between respective nodes, it should be appreciated that respective nodes could also have multiple connections, corresponding to multiple physical fibers or multiple light channels (e.g., as interpreted by a multiplexer) on a single physical fiber. A set of multiple physical or optical connections between nodes can be referred to as a multithreaded connection, while a single such connection can be referred to as a single-threaded connection.

As additionally shown by diagram 800, some chassis, multiplexers, or other hardware components in the circuit can be functionally divided into multiple sub-components, here "east" and "west" sub-components. In an aspect, the east and west sub-components of a particular hardware device can be functionally independent such that failure of one sub-component does not impair the functionality of the other. This can be advantageous in a circuit such as the one shown in diagram 800 to prevent total circuit outage in the event of a single sub-component failure. By way of example, in the event that the west multiplexer at node 1 fails, such a failure would not prevent operation of the east multiplexer at the same node from connecting to other nodes as normal. While respective nodes in diagram 800 are illustrated as connecting from east to west and vice versa, it should be appreciated that the east and west designations are merely for design purposes and that, in some cases, any suitable multiplexer at a first node could connect to any suitable multiplexer at a second node regardless of designation.

Figure 9:
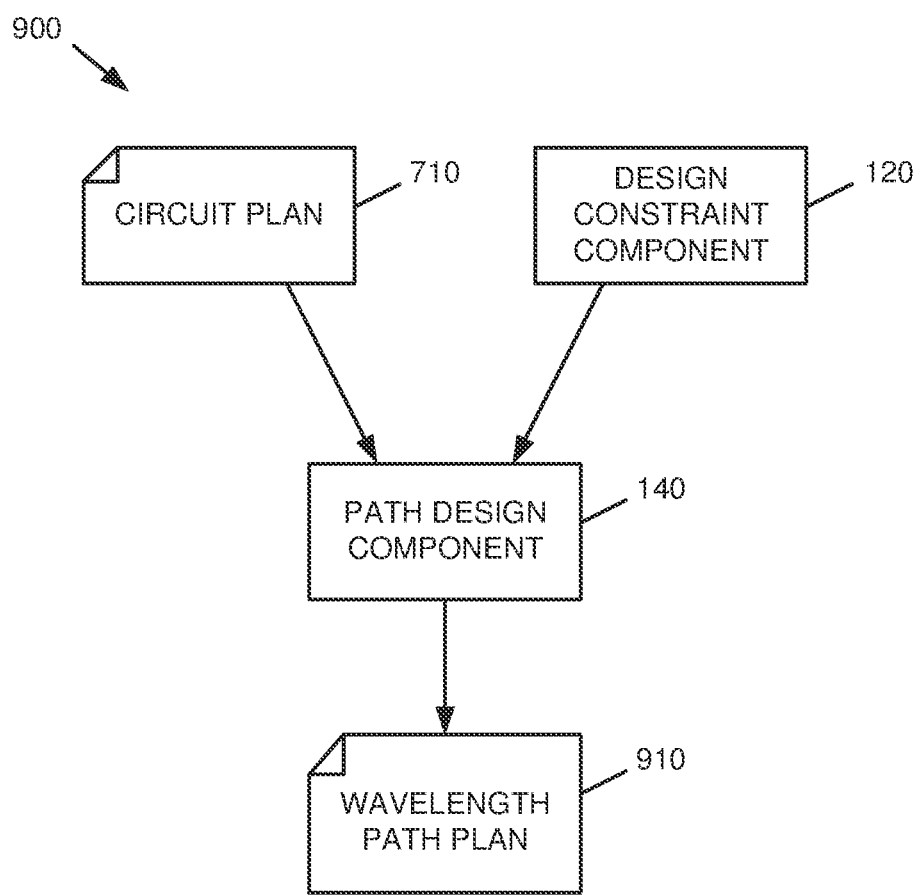
FIG. 9 is a block diagram of a system that facilitates creation of an optical wavelength path design for a dark fiber network in accordance with various aspects described herein.

Turning now to FIG. 9, a block diagram of a system 900 that facilitates creation of an optical wavelength path design for a dark fiber network in accordance with various aspects described herein is illustrated. Repetitive description of like elements employed in other embodiments described herein is omitted for sake of brevity. As shown in FIG. 9, the path design component 140 can assign optical wavelength paths to the circuit represented by the circuit plan 710 (e.g., as created by the circuit design component 130 as described above with respect to FIG. 7.). In an aspect, the path design component 140 can incorporate the components assigned by the hardware design component 110 (e.g., as assigned to a data record 30 as described above with respect to FIG. 4) as well as the circuit plan 710 to develop a wavelength path plan 910 containing full end-to-end path of light wavelengths for the network. For instance, returning to diagram 800 in FIG. 8, the wavelength path plan 910 could specify optical wavelengths (light channels) to be utilized for the connections between the respective nodes according to desired capacity, capabilities of the muxes at the respective nodes, and/or other criteria.

Figure 10:
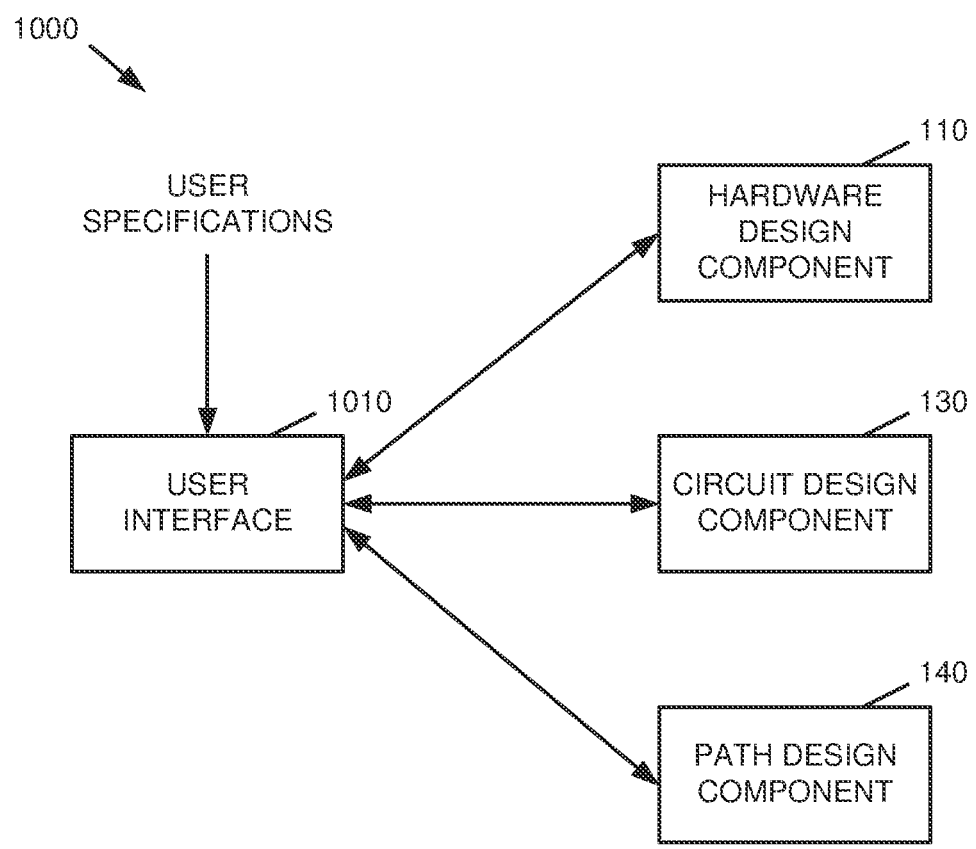
FIGS. 10-11 are block diagrams of respective systems that facilitate user-guided dark fiber network design for hardware, circuits, and paths in accordance with various aspects described herein.

Referring next to FIG. 10, a block diagram of a system 1000 that facilitates user-guided dark fiber network design for hardware, circuits, and paths in accordance with various aspects described herein is illustrated. Repetitive description of like elements employed in other embodiments described herein is omitted for sake of brevity. As shown by FIG. 10, system 1000 includes a user interface 1010 that can receive user specifications corresponding to a dark fiber network and guide the operation of the hardware design component 110, the circuit design component 130, and/or the path design component 140 as described above according to the provided specifications. In an aspect, the user interface 1010 can be provided as part of a software tool and/or other program that enables a user to provide network details to the respective design components 110, 130, 140. In an aspect, the user interface can contain one or more forms, menus, or the like, to guide a user in creating a desired network plan. Additionally, the design constraint component 120 (not shown in FIG. 10) can utilize one or more mechanisms to improve user accuracy with respect to the user interface 1010 by, e.g., placing rules into the design to guide the user along the design to alleviate errors, placing flags throughout the design to remove the possibility of a user deleting designs that are in service, and/or performing other similar functions. In another aspect, the user interface 1010 can also provide statistics, reports, and/or other information to the user to assist in building a design, determining where further network growth is needed, etc.

A general description of various aspects of an example user interface 1010 that can be utilized are provided below. It should be appreciated, however, that the description given below is merely intended as an example of functions that can be performed by the user interface 1010, and that other actions could be performed in addition to or in place of the described operations.

In an aspect, the user interface 1010 can be divided functionally into multiple tools, e.g., a hardware design tool, a circuit design tool, and a path design tool, which can generally correspond to the operation of the hardware design component 110, the circuit design component 130, and the path design component 140, respectively, as described above. In an aspect, the hardware design tool can be broken down into sections for building a hardware plan. These sections can include, for example, the following:

1) Add main chassis: Adds a main chassis to the hardware plan.

2) Add mux to main chassis: Adds a multiplexer to an existing main chassis in the hardware plan.

3) Add main chassis mux port allocations: Establishes usable ports for a multiplexer added to a main chassis.

4) Add extension chassis: Adds an extension chassis to an existing chassis in the hardware plan.

5) Add mux to extension chassis: Adds a multiplexer to an existing extension chassis in the hardware plan.

6) Add extension chassis mux port allocations: Establishes usable ports for a multiplexer added to an extension chassis.

7) Add supervisor connection to multiplexer: Adds a supervisor card to a main/extension chassis and associates the supervisor card with respective usable ports on a connected multiplexer.

Other sections could also be employed.

In an aspect, the circuit design tool can be set up to attach multiplexer ports via dark fiber. By creating dark fiber circuits via the circuit design tool, dark fiber muxes and associated chassis can be tied together, allowing for subsequent design of dark fiber paths. In an aspect, the circuit design tool can be broken down into sections for building a circuit plan. These sections can include, for example, the following:

1) Add dark fiber ring circuit: Connects nodes of the hardware plan in a ring configuration.

2) Add dark fiber point-to-point circuit: Connects nodes of the hardware plan in a point-to-point configuration.

Other sections could also be employed. In an aspect, the circuit design tool can create dark fiber circuit labels to be used to distinguish between different circuits. These created labels can also subsequently be usable in other systems.

By way of specific, non-limiting example, a point-to-point circuit that runs from an initial multiplexer at an A site to a final multiplexer at a Z site can be labeled as follows:

DaFi-CKT-(MUXA port label)-(MUXZ port label)-(circuit number).

The MUXA port label and MUXZ port label can be assigned based on the Common Language Location Identifier (CLLI) code of the site containing the respective muxes as well as the port number and port type of the respective muxes. By way of example, the following labels could be employed:

MUXA port label=AAAABBBB001-MUX1(COM),

MUXB port label=ZZZZWWWW002-MUX4(COM), where AAAABBBB001 and ZZZZWWWW002 are the respective site CLLI codes and MUX1(COM) and MUX4(COM) refer to communication ports on the respective muxes.

In another example, the circuit number can contain a numeric field that increments on each new circuit, e.g., 00001, 00002, etc.

Based on the above, a circuit label can be formed as follows:

DaFi-CKT-AAAABBBB001-MUX1(COM)-ZZZZWWWW002-MUX4(COM)-00001.

As the circuit number corresponding to each circuit is a unique identifier, a short-form format for the circuit label can also be utilized, e.g., DaFi-CKT-00001 for the example above.

A ring circuit label can be formed in a similar manner as described above for a point-to-point circuit, with the exception that only the starting point of the ring is used in the label. Thus, a ring circuit label can be assigned as follows:

DaFi-RING-AAAABBBB003-00001, where AAAABBBB003 corresponds to the first chassis in the ring. The ring circuit can also be given a short-form label in a similar manner to a point-to-point circuit, e.g., DaFi-RING-00001 for the example given above.

In another aspect, the path design tool can be set up to build end-to-end device connections based on a circuit as designed by the circuit design tool. The paths can be defined starting from an A end to a Z end, where the A end is the starting point (e.g., from the MSN towards the cell site, from the SIAD towards the BBU, from the BBU towards the RRH, from the MTSO to the point of presence (POP) in the case of a collector, etc.). Similar to the hardware and circuit design tools, the path design tool can have multiple sections depending on the path being created. These sections can include, e.g., the following:

1) Add DaFi backhaul path: Adds a path from an MSN to a SIAD.

2) Add DaFi shorthaul path: Adds a path from a SIAD to a BBU.

3) Add DaFi fronthaul path: Adds a path from a BBU to an RRH.

4) Add DaFi collector path: Adds a path from an MTSO to a telecommunications entity (e.g., a POP, etc.).

Other sections could also be used.

In an aspect, the path design tool can be used to build an actual A-to-Z path from one specific device to another specific device using the hardware and circuits built in the previous tools. The path design tool can be used to create paths for backhaul, shorthaul, fronthaul, or collector designs. The starting point of a path can be assumed from a starting point at the MTSO moving toward the radio at a site. As such, the A-Z hierarchy can be from MSN to SIAD to BBU to RRH to MSN to telecommunications office.

In an aspect, the path design tool can create path labels in a similar manner to the circuit labels generated by the circuit design tool. By way of specific, non-limiting example, a dark fiber path can be labeled as follows:

DaFi-Path-(A-side device CLLI code)-(Z-side device CLLI code)-(type)-(circuit number).

The A-side and Z-side CLLI codes can correspond to the CLLI codes of the devices according to the hierarchy given above, e.g., AAAABBBB001 and ZZZZWWWW001. The type can be based on the path type employed, e.g., BH for backhaul, SH for shorthaul, FH for fronthaul, and GN for generic or general transport. The path number can contain a numeric field that increments on each new path, e.g., 00001, 00002, etc.

Based on the above, a path label can be formed as follows:

DaFi-Path-AAAABBBB001-ZZZZWWWW002-BH-00001.

As the path number corresponding to each circuit is a unique identifier, a short-form format for the path label can also be utilized, e.g., DaFi-Path-00001 for the example above.

Once the path name is created, fiber segments can be established within the dark fiber path that begin at the A device and end at the Z device. These segments can represent each leg in the design for connecting fibers to ports on the dark fiber equipment, connecting dark fiber circuits in the design, assigning legs around a dark fiber ring, etc. In an aspect, paths designed at this stage can include information relating to light colors in addition to physical connections in order to facilitate optical connections between the respective points. Light colors used at this stage can be based on, e.g., available mux channels at respective points, supported colors at respective network endpoints, etc.

At respective steps along the design process described above, the user interface 1010 can provide guidance to a user in building a dark fiber network. For instance, functional path labels can be established to uniquely identify path designs, rules can be established to check the designs for accuracy, and components of respective paths can be segmented to simplify data. By combining the hardware, circuit, and path design tools as described above, a user can be provided flexibility in creating a dark fiber solution within a wireless network.

In addition to an initial circuit design, various aspects as provided herein can also be utilized to facilitate future network expansion. For instance, for a network in which growth is anticipated, the network can initially be designed with more fibers and/or optical channels than are initially utilized in order to facilitate revisiting the network later to utilize further open channels as desired.

Figure 11:
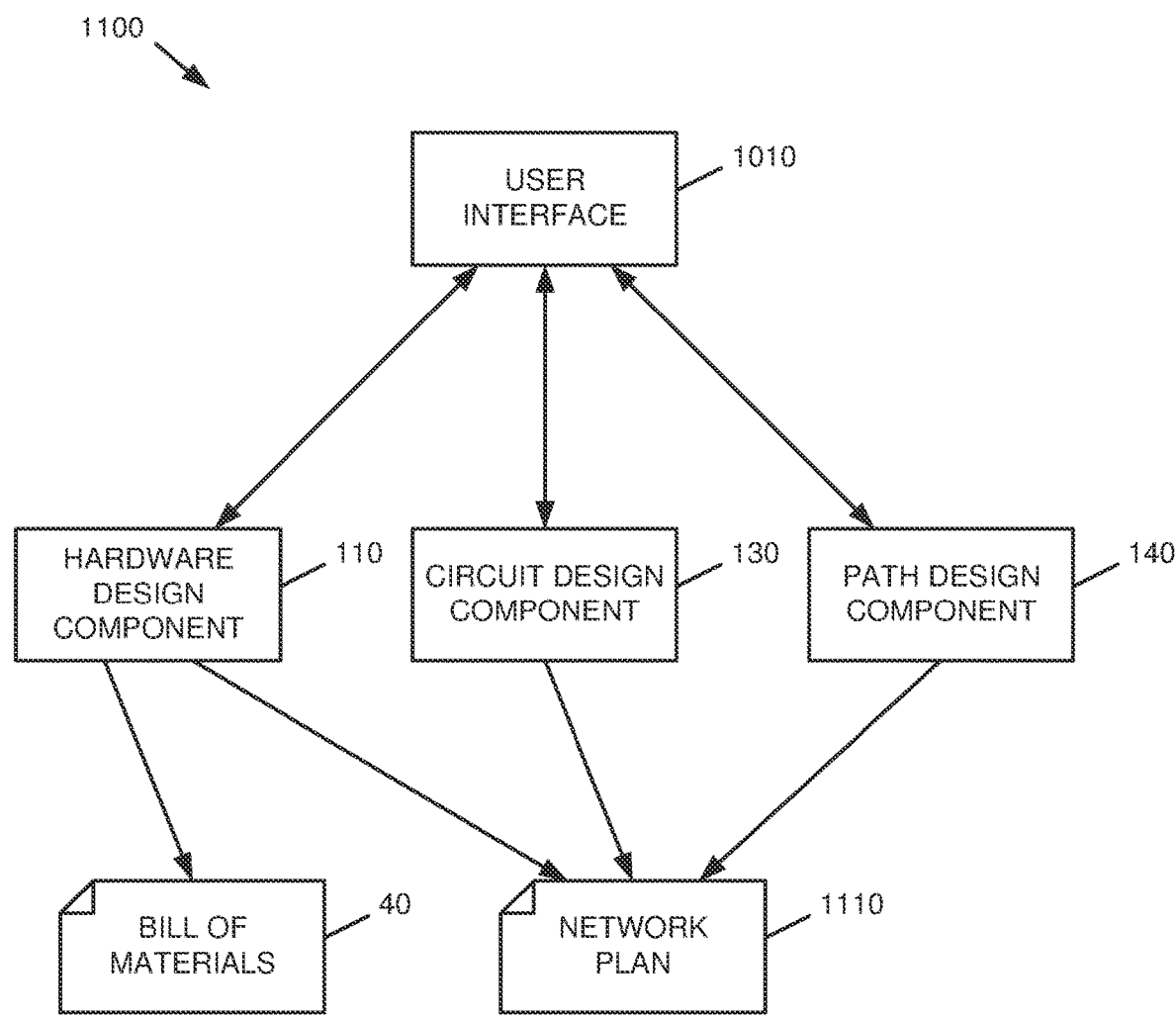

Turning now to FIG. 11, a block diagram of another system 1100 that facilitates user-guided dark fiber network design for hardware, circuits, and paths in accordance with various aspects described herein is illustrated. Repetitive description of like elements employed in other embodiments described herein is omitted for sake of brevity. System 1100 as shown in FIG. 11 includes a user interface 1010 that can be utilized in combination with a hardware design component 110, a circuit design component 130, and a path design component 140 to facilitate design of a dark fiber network as described above. As further shown in FIG. 11, operation of the user interface 1010 can result in various outputs of the hardware design component 110, the circuit design component 130, and the path design component 140, including a BOM 40 as described above with respect to FIG. 5 and a network plan 1110. In an aspect, the network plan 1110 can be a machine-readable representation of a network topology for a geographical area in which the planned network is located. For instance, the network plan 1110 can be an Extensible Markup Language (XML) representation of the network as designed by system 1100, which can be sent to one or more downstream systems to facilitate building out the network as designed. Additionally, system 1100 could output one or more reports that contain information relating to the network plan 1110 and/or its respective component parts, which can facilitate user understanding of the planned network as well as portions of the network where future expansions could be made. Other outputs are also possible.

Figure 12:
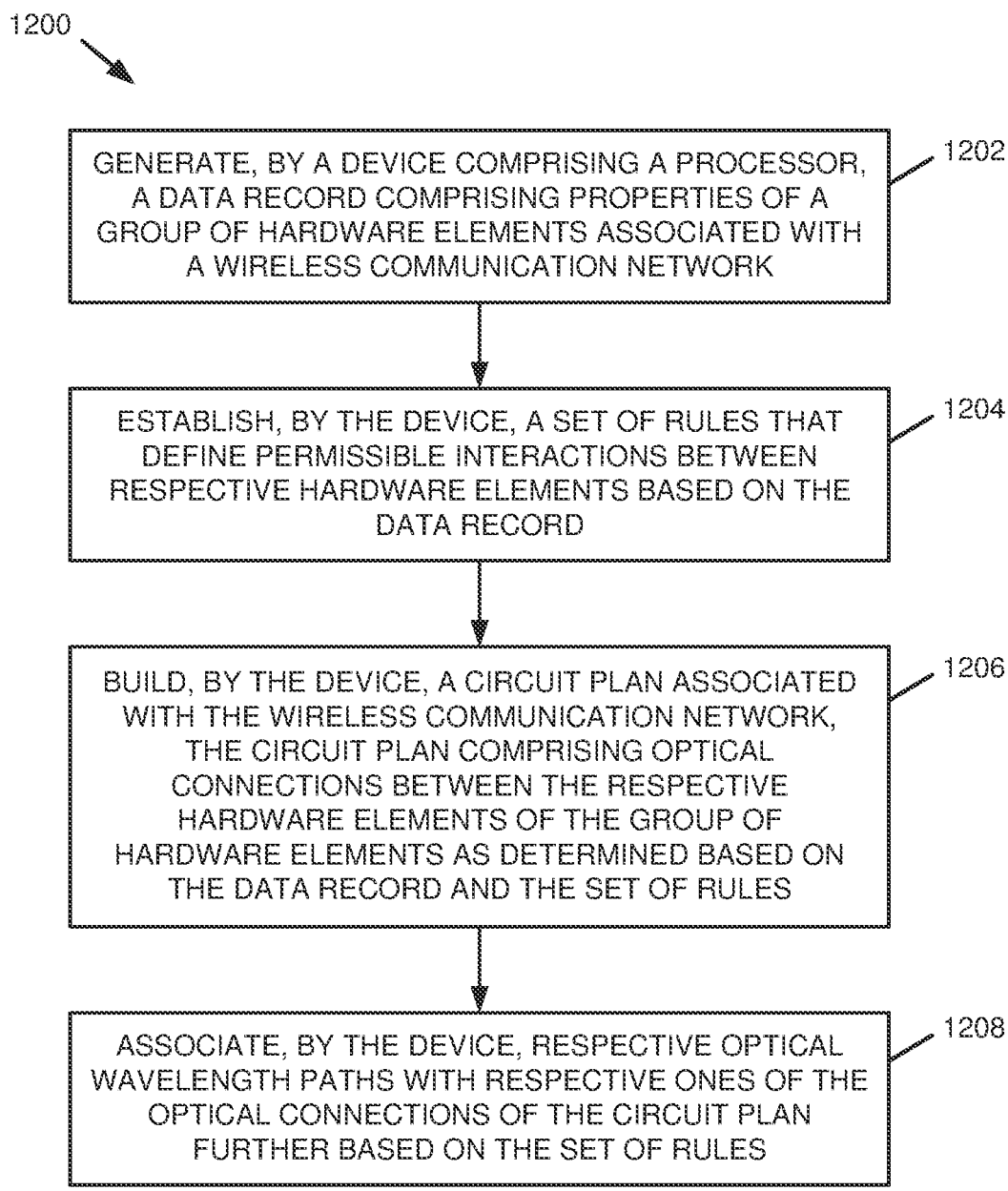
FIG. 12 is a flow diagram of a method for dark fiber network design for hardware, circuits, and paths in accordance with various aspects described herein.

FIG. 12 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram.

Moreover, not all illustrated acts may be required to implement methods in accordance with certain aspects of this disclosure.

With reference to FIG. 12, a flow diagram of a method 1200 for dark fiber network design for hardware, circuits, and paths in accordance with various aspects described herein is presented. At 1202, a device comprising a processor (e.g., a processor 20) can generate (e.g., via a hardware design component 110) a data record (e.g., a data record 30) that includes properties of a group of hardware elements associated with a wireless communication network.

At 1204, the device can establish (e.g., by a design constraint component 120) a set of rules that define permissible interactions between the respective hardware elements established at 1202 based on the data record generated at 1202.

At 1206, the device can build (e.g., by a circuit design component 130) a circuit plan (e.g., a circuit plan 710) associated with the wireless communication network. The circuit plan can include optical connections between the respective hardware elements established at 1202 as determined based on the data record generated at 1202 and the set of rules established at 1204.

At 1208, the device can associate (e.g., by a path design component 140) respective optical wavelength paths (e.g., as given by a wavelength path plan 910) with respective ones of the optical connections of the circuit plan built at 1206 further based on the set of rules established at 1204.

Figure 13:
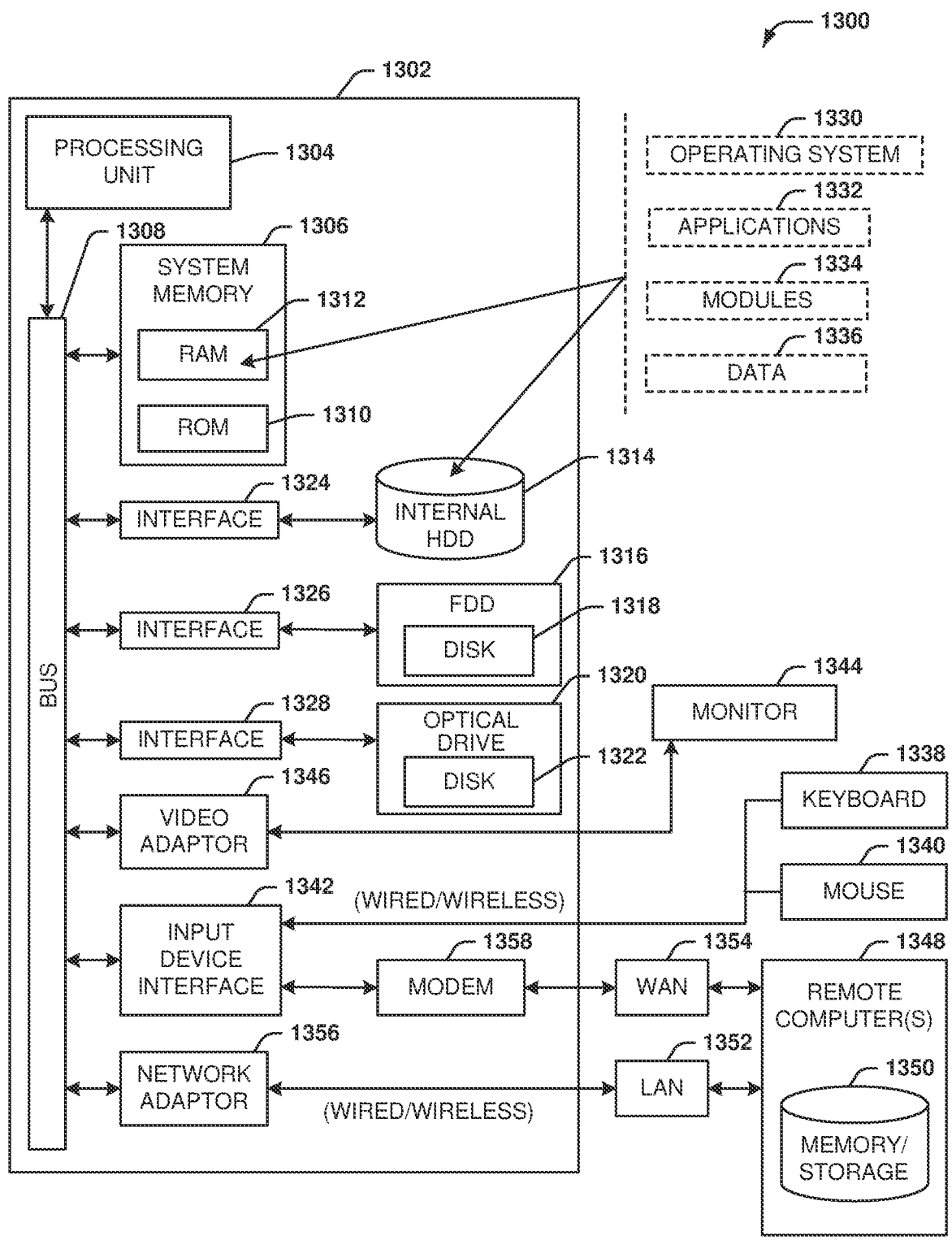
FIG. 13 depicts an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). While the internal HDD 1314 is illustrated as located within the computer 1302, the internal HDD 1314 can also be configured for external use in a suitable chassis (not shown). The HDD 1314, magnetic FDD 1316 and optical disk drive 1320 can be connected to the system bus 1308 by an HDD interface 1324, a magnetic disk drive interface 1326 and an optical drive interface 1328, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by a system comprising a processor, a data record that identifies respective equipment of a group of dark fiber equipment that have been assigned for a development of new dark fiber network infrastructure usable via a communication network;
generating, by the system, a circuit plan representing optical connections between the respective ones of the group of dark fiber equipment as determined based on a first constraint defined by rules; and
associating, by the system, respective optical wavelength paths with respective connections of the optical connections of the circuit plan based on a second constraint defined by the rules.

2. The method of claim 1, wherein the group of dark fiber equipment comprises respective optical multiplexers.

3. The method of claim 2, wherein the data record further identifies respective port capacities of the respective optical multiplexers, and wherein the first constraint comprises a permissible set of optical connections between the respective optical multiplexers based on the respective port capacities.

4. The method of claim 2, wherein the data record further identifies supported optical wavelengths associated with the respective optical multiplexers, and wherein the second constraint comprises permissible optical wavelengths for the respective optical wavelength paths based on the supported optical wavelengths.

5. The method of claim 1, wherein the group of dark fiber equipment comprises a chassis that houses respective other ones of the group of dark fiber equipment, and wherein the first constraint comprises an equipment slot capacity of the chassis.

6. The method of claim 1, wherein the group of dark fiber equipment comprises a transponder, and wherein the first constraint comprises a port capacity of the transponder.

7. The method of claim 1, further comprising:
generating, by the system, the rules based on permissible interactions between the respective equipment of the group of dark fiber equipment.

8. The method of claim 7, wherein generating the rules comprises generating the rules further based on a design specification received via a user interface.

9. The method of claim 1, further comprising:
generating, by the system, a machine-readable network plan comprising a listing of the respective equipment of the group of dark fiber equipment identified by the data record, the circuit plan, and the respective optical wavelength paths.

10. The method of claim 9, wherein the machine-readable network plan comprises respective mutually distinct labels for the respective ones of the group of dark fiber equipment.

11. A system, comprising:
a processor; and
a memory that stores executable instructions that, when executed by the processor, facilitate performance of operations, the operations comprising:
producing a data record that identifies respective ones of a group of dark fiber devices that are assigned for implementation in new dark fiber network infrastructure for implementation as part of a communication network;
constructing a circuit plan for the communication network, the circuit plan comprising optical connections between the respective ones of the group of dark fiber devices as determined based on a first constraint defined by rules; and
assigning respective optical wavelength paths to respective ones of the optical connections of the circuit plan according to a second constraint defined by the rules.

12. The system of claim 11, wherein the operations further comprise:
   generating the rules based on permissible interactions between the respective ones of the group of dark fiber devices.

13. The system of claim 12, wherein the operations further comprise:
   receiving design specifications via a user interface; and
   generating the rules further based on the design specifications.

14. The system of claim 11, wherein the operations further comprise:
   generating a machine-readable network plan comprising a listing of the respective ones of the group of dark fiber devices, the circuit plan, and the respective optical wavelength paths.

15. The system of claim 14, wherein the machine-readable network plan comprises respective mutually distinct labels for the respective ones of the group of dark fiber devices.

16. A non-transitory machine-readable medium comprising executable instructions that, when executed by a processor, facilitate performance of operations, the operations comprising:
   generating a listing of dark fiber devices that are associated with a development of new dark fiber network infrastructure for usage via a communication network;
   generating a circuit plan representing respective optical connections between the respective ones of the group of dark fiber devices subject to a first constraint defined by rules; and
   assigning respective optical wavelength paths to respective ones of the optical connections subject to a second constraint defined by the rules.

17. The non-transitory machine-readable medium of claim 16, wherein the operations further comprise:
   generating the rules based on permissible interactions between the respective ones of the group of dark fiber devices in the listing.

18. The non-transitory machine-readable medium of claim 17, wherein the operations further comprise:
   generating the rules further based on design specifications received via a user interface.

19. The non-transitory machine-readable medium of claim 16, wherein the operations further comprise:
   generating a machine-readable network plan comprising the listing, the circuit plan, and the respective optical wavelength paths.

20. The non-transitory machine-readable medium of claim 19, wherein the operations further comprise:
   applying respective mutually distinct labels to the respective ones of the group of dark fiber devices in the machine-readable network plan.

* * * * *